UNITED STATES PATENT OFFICE.

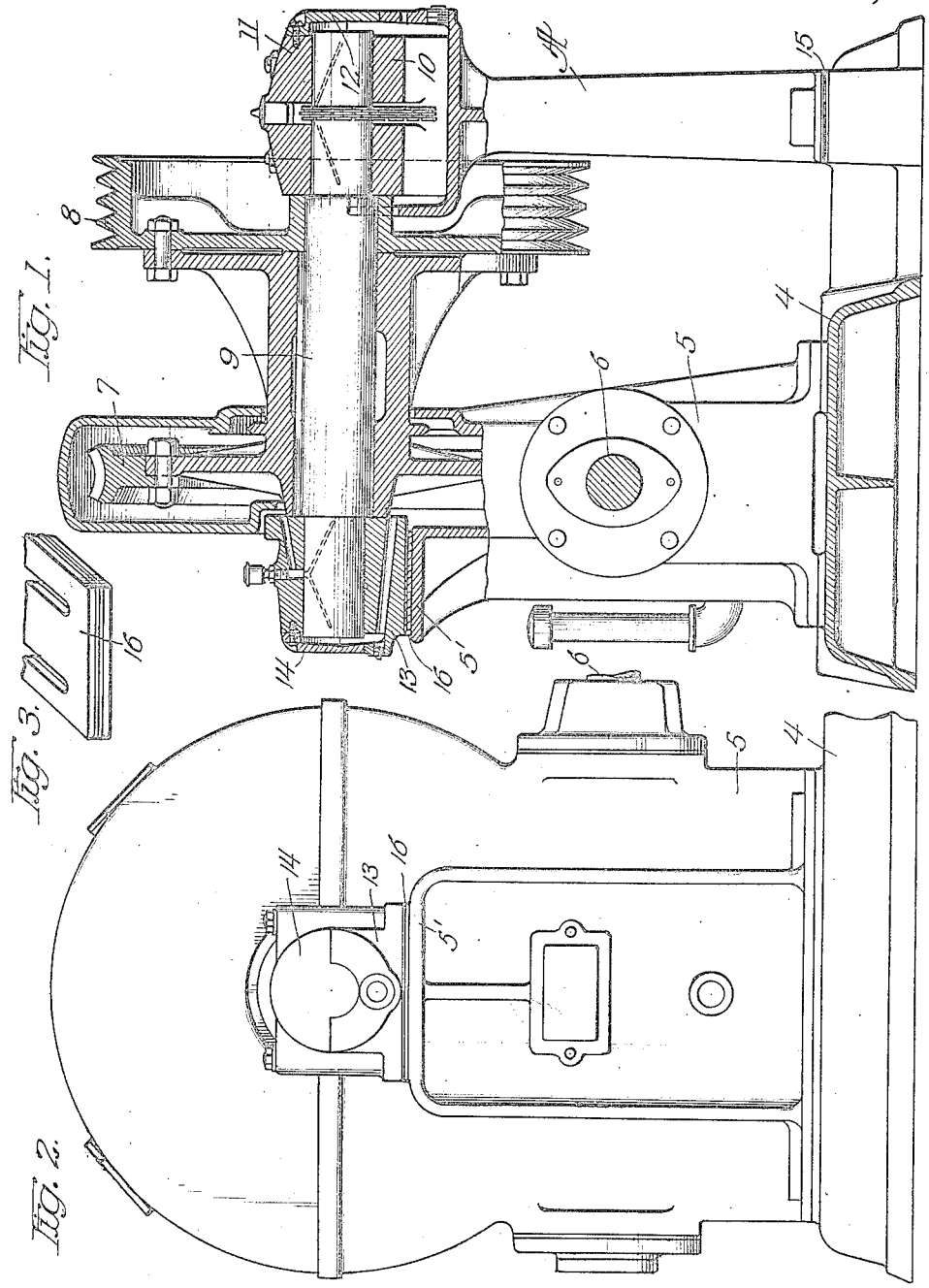

JACOB D. SCHAKEL, OF CHICAGO, ILLINOIS, ASSIGNOR TO ELEVATOR COMPANY OF AMERICA, OF CHICAGO, ILLINOIS.

ADJUSTABLE BEARING FOR ELEVATOR MACHINES.

1,402,895. Specification of Letters Patent. Patented Jan. 10, 1922.

Application filed December 12, 1918. Serial No. 266,412.

*To all whom it may concern:*

Be it known that I, JACOB D. SCHAKEL, a citizen of the United States, residing at Chicago, in the county of Cook and State of Illinois, have invented a certain new and useful Improvement in Adjustable Bearings for Elevator Machines, of which the following is a full, clear, concise, and exact description, reference being had to the accompanying drawings, forming a part of this specification.

My invention relates to elevator machines and has to do more particularly with the provision of an improved bearing construction for the sheave and sheave worm gear shaft. One of the objects of my invention is to provide bearings which are adjustable upon the main base so that they may be machined before being secured to the base but adjustable in such a way that the worm gear may be properly adjusted relative to the worm in the original installation thereof and later on adjusted to take up for any wear.

Hitherto in machines of this character the practice has been to secure the bearing-boxes to the base, then adjust the worm gear in its proper relation to the worm and thereafter pour in the bearing babbitt so as to form a suitable bearing at each end of the shaft. The machine was then dismantled and the bearings scraped if necessary and the machine reassembled. This, of course, was an expensive proceeding. This is all eliminated in my improved construction wherein the shaft bearings are finished prior to being secured to the base and the construction is such that they may be adjusted to secure the proper fit between the worm gear and worm.

For a better understanding of my invention reference is to be had to the accompanying drawing in which—

Fig. 1 is a side elevation, partly in section, showing the preferred form of my improved construction;

Fig. 2 is an end view of Fig. 1; and

Fig. 3 is a perspective view of shims of various thickness adapted for insertion between the bearing-boxes or stands and the base.

Referring now more in detail to the construction illustrated, it comprises a well-known form of base 4 having a gear housing 5 supporting a worm 6 adapted to mesh with a worm gear 7 connected with a sheave 8, the gear 7 and sheave being rigidly secured to the main shaft 9. This shaft 9 is supported at one end in a bearing carried by the sheave stand A, said stand having a bearing at its upper end comprising a lower portion 10 preferably integral with the stand, and a removable cap 11 together with an end cap 12. This bearing is preferably bored out and finished before it is attached to the base 4.

At the gear end of the shaft 9, a second bearing is provided comprising a housing 13 having an end cap 14 removably secured thereto and so constructed, that when removed, the housing 13 may be bored straight through to fit the corresponding end of the shaft 9. This bearing 13 is machined and finished to properly fit the shaft 9 after which it is adjustably secured to the bracket 5' of the housing 5.

In machining the various elements of a machine of this character it is practically impossible to avoid inaccuracies. That is, due to slight differentiations the parts do not always come together properly. Now in order that there may be a proper fit between the worm gear 7 and worm 6, I machine the corresponding faces of the bearing 13 and bracket 5', and the corresponding faces of the stand A and base 4, so that there is a sufficient clearance to receive shims such as are shown in Fig. 3. Thus after the bearings 13, 10 are placed upon the corresponding ends of the shaft 9, the parts are placed upon the base and then shimmed up at 15, 16 until the proper adjustment is secured between the gear 7 and worm 6 and the parts properly aligned.

It will thus be apparent that by my improved construction, all of the parts may be completely machined and finished before assembling, and by using the proper shims the parts are suitably adjusted.

Another advantage of this construction is that as the gears wear from use, the bearings may be readjusted upon the base by removing or inserting the proper shims thus avoiding rebabbitting and refinishing of the bearings as was heretofore done.

For the purpose of illustrating my invention I have shown it in the preferred form, but I contemplate applying it in other ways than that shown, and understand that changes and modifications will readily occur to those skilled in the art. Therefore, I do not desire to be limited to the exact construction shown and described but aim to cover all that which comes within the spirit and scope of the appended claims.

What I claim as new and desire to secure by Letters Patent is:—

1. In a machine of the character described, a base provided with a fixed and an adjustable standard, said adjustable standard having a bearing therein, a worm mounted in said fixed standard, a bearing member carried by said fixed standard and adjustable relatively thereto, a shaft mounted in said bearings and a worm gear mounted on said shaft and adapted to mesh with said worm, whereby said worm gear may be adjusted relatively to said worm.

2. In a machine of the character described, a base provided with a fixed and an adjustable standard, said adjustable standard having a bearing therein, a worm mounted in said fixed standard, a bracket carried by said fixed standard, a bearing member adjustably mounted on said bracket, a shaft mounted in said bearings and a worm gear mounted on said shaft and adapted to mesh with said worm, whereby said worm gear may be adjusted relatively to said worm.

In witness whereof, I hereunto subscribe my name this 22nd day of November A. D., 1918.

JACOB D. SCHAKEL.